United States Patent [19]

Bobath

[11] 4,385,850

[45] May 31, 1983

[54] DEVICE FOR JOINING PANELS EDGE-TO-EDGE

[75] Inventor: Peter L. Bobath, Gerrards Cross, England

[73] Assignee: Spacetrekker Products Limited, Bagshot, England

[21] Appl. No.: 147,604

[22] Filed: May 7, 1980

[30] Foreign Application Priority Data

May 8, 1979 [GB] United Kingdom ............... 7915903

[51] Int. Cl.³ ............................................... F16B 1/00
[52] U.S. Cl. .................................. 403/205; 403/231;
403/403; 52/461
[58] Field of Search .................... 52/461, 282, 288;
403/231, 205, 403

[56] References Cited

U.S. PATENT DOCUMENTS 2,073,278 3/1937 Hohl ..................................... 52/461
2,449,904 9/1948 Lorraine ................................ 16/7

FOREIGN PATENT DOCUMENTS 202340 7/1956 Australia ............................... 52/461

*Primary Examiner*—Andrew V. Kundrat
*Attorney, Agent, or Firm*—Remy J. VanOphem

[57] ABSTRACT

A device for joining panels, including first and second sections which, when connected together, provide recesses for receiving the edges of the panels. Each section has two wall portions adapted to lie substantially parallel to the panels to be joined and a connection member between the wall portions. Each connection member includes two spaced limbs, the two limbs of the first section being adapted to be inserted into a recess formed between the two limbs of the second section and each limb of the first section being provided with a series of serrations engageable with a series of serrations provided on a respective one of the limbs of the second section. The limbs of the second section are substantially rigid and the limbs of the first section diverge before insertion and are resilient, so that upon insertion they are pressed together and cause their associated wall portions to be pushed into clamping contact with surfaces of the panels.

9 Claims, 5 Drawing Figures

DEVICE FOR JOINING PANELS EDGE-TO-EDGE

BACKGROUND OF THE INVENTION

This invention relates to a device for joining panels edge-to-edge.

The invention has a wide range of possible applications. It can be used for joining panels to form walls for vehicle bodies such as goods vehicles or mobile units. It can also be used in the building industry for prefabricated buildings such as greenhouses or garages, or for constructing office partitions or shop fittings, or in the furniture building industry, particularly for items such as kitchen cabinets.

SUMMARY OF THE INVENTION

According to the present invention there is provided a device for joining panels, including first and second sections which, when connected together, provide recesses for receiving the edges of the panels, each section having at least two wall portions adapted to lie substantially parallel to the panels to be joined and a connection member between the wall portions, each connection member including two spaced limbs, the two limbs of the first section being adapted to be inserted into a recess formed between the two limbs of the second section and each limb of said first section being provided with a series of serrations engageable with a series of serrations provided on a respective one of the limbs of the second section, wherein the limbs of the second section are substantially rigid and the limbs of the first section diverge before insertion and are resilient so that upon insertion they are pressed together and cause their associated wall portions to be pushed into clamping contact with the surfaces of the panels.

Preferably, one of the first and second sections is elongated and a plurality of the other of the first and second sections and adapted to be connected to the one elongated section in spaced relationship along the longitudinal extent of the one elongated section.

Conveniently, the elongated section is the second section.

Advantageously, the device further includes an elongate cover strip, each of the other sections being provided with means for supporting the cover strip.

Conveniently, the support means includes a pair of grooves formed in each of the other sections at or adjacent the edges thereof remote from the associated connection member.

Conveniently, the cover strip has adjacent each longitudinal edge an elongated flange engageable in a respective groove of each of the other sections and a cover portion which, in use, extends beyond the respective edge of each of the other sections.

The two wall portions of each section may be parallel or substantially parallel to each other. In this case the device will join two panels edge to edge in a common plane.

Alternatively, the two wall portions of each section may be at an angle to each other. If, for example, this angle is 90°, the device will join two panels which extend at right angles to each other.

BRIEF DESCRIPTION OF THE DRAWINGS

The invention will now be more particularly described, by way of example, with reference to the accompanying drawings, wherein.

DETAILED DESCRIPTION OF THE PREFERRED EMBODIMENT

Figure 1:
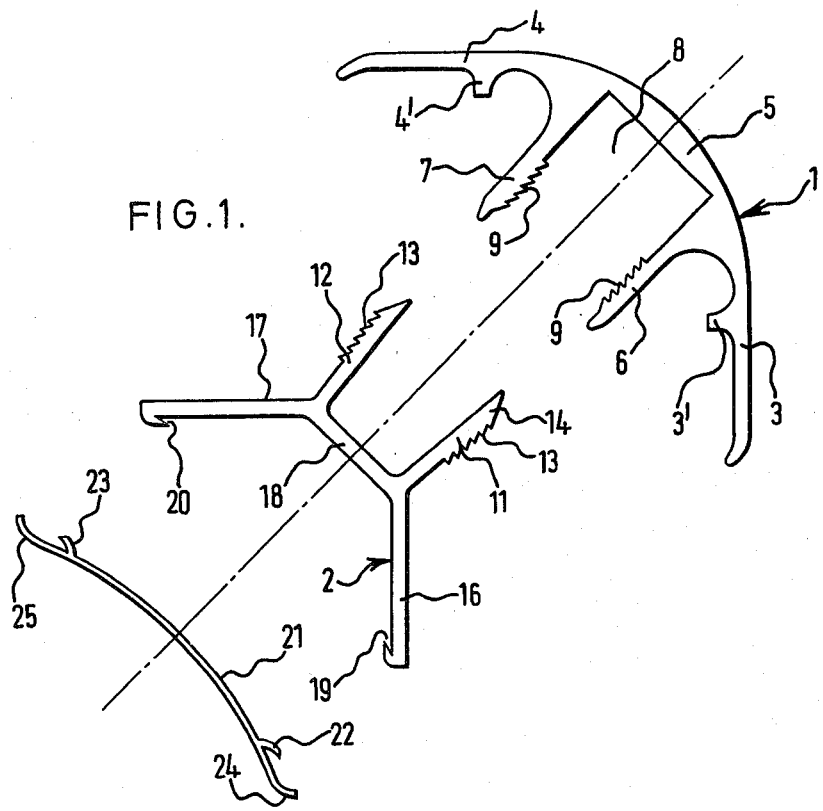
FIG. 1 is an exploded plan view of one embodiment of the device according to the invention.
Figure 2:
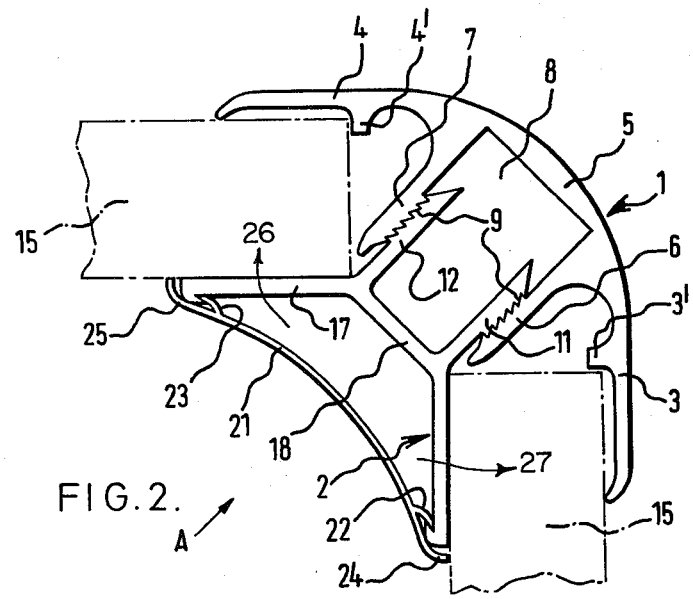
FIG. 2 is a plan view of the device shown in FIG. 1, when assembled.
Figure 3:
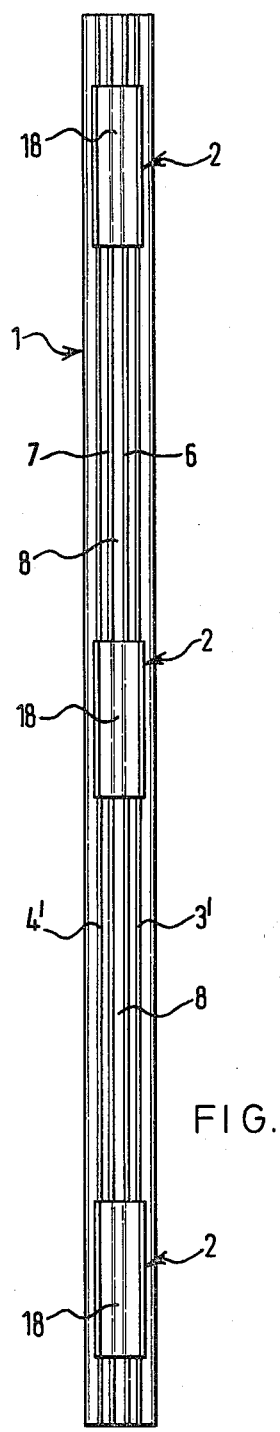
FIG. 3 is a view taken in the direction of the arrow A of FIG. 2 with the cover strip omitted for reasons of clarity.

Referring to FIGS. 1-3, the device shown therein includes a single elongated outer section 1 and three inner sections 2, which are adapted to be connected to the outer section 1 in spaced relationship along the longitudinal extent of the outer section 1—see particularly FIG. 3. The outer section 1 has two wall portions 3, 4 connected by a curved corner wall portion 5. Extending parallel to each other from the wall portion 5 are two limbs 6, 7 which form therebetween a recess 8 and which are each provided with serrations 9 on their inner surfaces.

The wall portions 3, 4 are at right angles to one another, so that they lie parallel to panels at right angles to one another.

Each inner section 2 has wall portions 16, 17, also at right angles to one another, connected by an intermediate portion 18. Each inner section 2 has two limbs 11, 12 provided with serrations 13 on their outer surfaces. Each limb 11, 12 has a lead-in portion 14 to guide the limbs 11, 12 between the limbs 6, 7. It will be noted that the limbs 11, 12 diverge from each other slightly, e.g. by an angle of 10°.

Each inner section 2 has a pair of grooves 19, 20 formed at or adjacent the edges of the wall portions 16, 17 respectively remote from the limbs 11, 12. The grooves 19, 20 of the three inner sections 2 serve to support an elongated cover strip 21 which has adjacent each longitudinal edge elongated flanges 22, 23 engageable in a respective groove 19, 20 of each of the inner sections 2 and a cover portion 24, 25, which extends beyond the respective edge of each of the inner sections 2 (see particularly FIG. 2).

The limbs 6, 7 of the outer section 1 are substantially rigid and the limbs 11, 12 of each section 2 are resilient so that when the limbs 11, 12 are inserted into the recess 8 formed between the limbs 6, 7 of the outer section 1 they were pressed together and cause their associated wall portions 16, 17 to be pushed towards the wall portions 3, 4 respectively of the outer section 1 and thus into clamping contact with surfaces of the panels as will be described hereinafter.

The term "substantially rigid" is intended to encompass any construction of the limbs 6, 7 which renders the limbs 6, 7 undeformable or substantially undeformable as the resilient, diverging limbs 11, 12 are inserted into the recesses 8.

In a preferred embodiment, the material of which the outer section 1 is formed is less resilient than the material of which each inner section 2 is formed, e.g. the outer section 1 may be formed of a metal such as aluminum and each section 2 may be formed of a plastic material. However, the inner and outer sections 1 and 2 may be formed of the same material and the limbs 6, 7 may have a greater dimension than the limbs 11, 12 in a direction parallel to the spacing between each pair of limbs or the limbs 6, 7 may be reinforced or they may be supported relative to a respective wall portion 3, 4.

In use of the device, panels 15 (see FIG. 2) are positioned against the wall portions 3, 4, with their edges against inwardly extending projections 3', 4'. The edges of the panels will normally be cut off at right angles. While the panels 15 are held in this position, the limbs 11, 12 of each inner section 2 are inserted between the limbs 6, 7 of the outer section 1 so that the serrations 13 engage with the serrations 9. Each inner section 2 is pushed in as far as it will go, to reach the position shown in FIG. 2. Because the limbs 11, 12 diverge and because the limbs 6, 7 are substantially rigid and the limbs 11, 12 are resilient, when the limbs 11, 12 are received between the parallel limbs 6, 7, they will be pressed towards one another. This will result in the wall portions 16, 17 moving in the direction of arrows 26, 27 so that they exert a clamping force on the panels 15.

As will be seen from FIG. 3, the inner sections 2 are arranged in spaced relationship along the longitudinal extent of the outer section 1 and the elongated cover strip 21 is then fixed to the inner sections 2 by pressing the flanges 22, 23 into the respective grooves 19, 20, to give the joint a pleasing appearance.

The use of the interengageable serrations on the limbs of the outer section 1 and the outer section 2 renders the device capable of joining panels of various thickness, although each set of two panels so joined should be of equal thickness.

Figure 4:
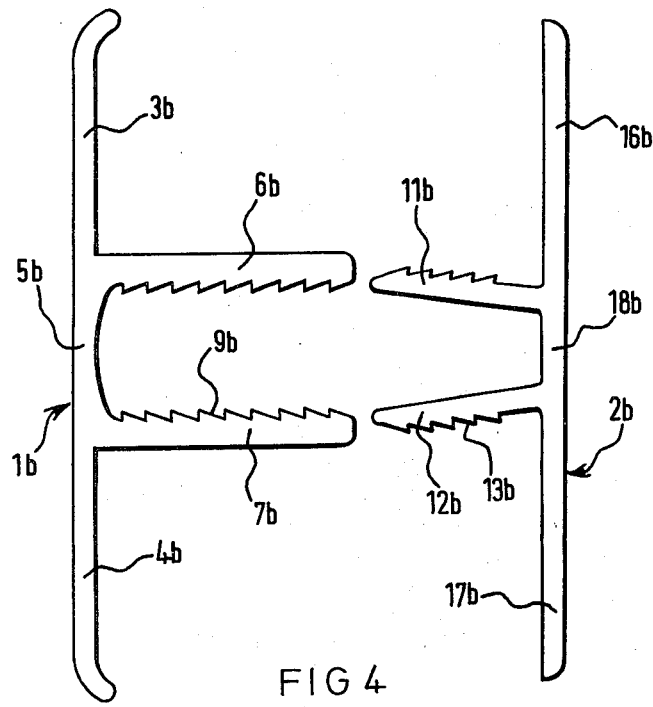
FIG. 4 is an exploded plan view of another embodiment of the device.

The embodiment shown in FIG. 4 is for joining two panels lying in the same plane. The outer section 1b has two wall portions 3b, 4b and an intermediate connecting portion 5b all of which lie in the same plane. Two limbs 6b, 7b extend parallel to each other from the portion 5b and are provided with serrations 9b. Each inner section 2b also includes wall portions 16b, 17b and an intermediate connecting portion 18b, all of which lie in a common plane. Two diverging limbs 11b, 12b extend from the portion 14b and are provided with serrations 13b on their outer surfaces.

Figure 5:
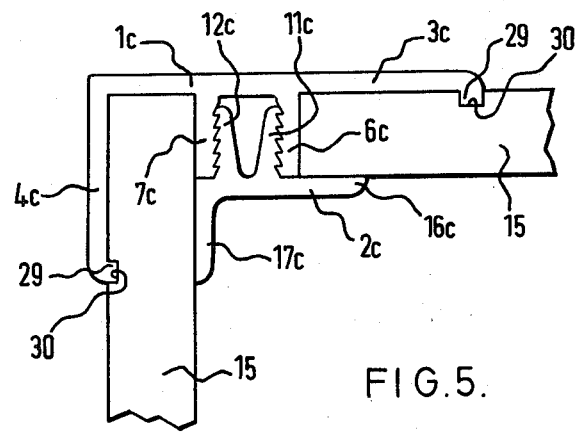
FIG. 5 is a plan view of yet another embodiment of the device, when assembled.

In the embodiment of FIG. 5, when assembled the limbs 6c, 7c of the outer section 1c and the limbs 11c, 12c of each inner section 2c are parallel with one panel and at right angles to the other panel. Each inner section 2c has wall portions 16c and 17c at right angles to one another and the wall portion 4c of the outer section 1c has a right angled bend 28. Moreover, the outer section 1c has lips 29 at the ends of the wall portions 3c, 4c. These lips 29 engage in corresponding grooves 30 formed in the panels 15.

The sections are preferably extruded.

Advantages of the device described are that the panels do not need to be slid into the sections in the longitudinal direction of the sections but rather are just placed against one of the sections and each of the other sections is positioned to hold the panels in place. A second important advantage is that the edges of the panels are clamped.

The elongated section may have resilient limbs while the shorter sections have substantially rigid limbs, but in this case the limbs of the shorter section will define the recess into which diverging limbs of the elongated section can be inserted.

It will be noted that in the embodiments shown in FIGS. 1-4, the wall portions 3, 4 and 3b, 4b, have inwardly curved edges. This permits an insulation strip (not shown) to be sandwiched between the outer edge of the panel 15 and the respective wall portion. Additionally, the line contact of the curved edge with the outer surface of the panel will provide a seal between the wall portion and the panel. This is particularly convenient when the joint will be used outdoors, e.g. for the corners of vehicle bodies.

Also, it should be noted that an advantage of using different materials for the sections 1, 2; 1b, 2b; and 1c, 2c is that this will assist in controlling the cold bridge, i.e. heat loss, across the device.

I claim:

1. A device for joining panels, said device comprising:
   a first section;
   a second section mounted to said first section, said first and second section mounted together to define recesses between said first and second section for receiving the edges of said panels to be joined;
   said first and second section each having at least two wall portions;
   a first connection member interposed said at least two wall portions of the first section, said first connection member having two diverging resilient limbs, each of said two limbs further being provided with a plurality of serrations;
   a second connection member interposed said at least two wall portions of the second section, said second connection member having two substantially rigid limbs fixed relative to each other defining a recess therebetween, each of said two limbs being provided with a plurality of serrations; and
   said two diverging resilient limbs of said first connection member further being adapted to be inserted into said recess defined by said two substantially rigid limbs of the second connection member and being sufficiently flexible toward each other yet rigid with their associated wall portions such that upon insertion of the two diverging resilient limbs of the first connection member into the recess defined by said two substantially rigid limbs of the second connection member; said resilient limbs are deflected toward each other and the associated wall portions of said first section are, as a result, deflected toward the other wall portions, the first and section sections are also pressed toward each other and the plurality of serrations on the two diverging resilient limbs engage the plurality of serrations on the two substantially rigid limbs to secure said first connection member to said second connection member whereby the associated first and second section wall portions are pushed into clamping contact with the respective surfaces of the panels to be joined.

2. A device as claimed in claim 1, wherein the two wall portions of each section are parallel or substantially parallel to each other.

3. A device as claimed in claim 1, wherein the two wall portions of each section are at an angle to each other.

4. A device as claimed in claim 3, wherein the angle is 90° or substantially 90°.

5. A device as claimed in claim 1, wherein one of the first and second sections is elongated and wherein a plurality of the other of said first and second sections are adapted to be connected to said one elongated section in spaced relationship along the longitudinal extent of the one elongated section.

6. A device as claimed in claim 5, wherein the elongated section is the second section.

7. A device as claimed in claim 5 or 6, further comprising an elongated cover strip, each of the other sections being provided with means for supporting the cover strip.

8. A device as claimed in claim 7, wherein the support means comprises a pair of grooves formed in each of the other sections at or adjacent the edges thereof remote from the associated connection member.

9. A device as claimed in claim 8, wherein the elongated cover strip has adjacent each longitudinal edge an elongated flange engageable in a respective groove of each of the other sections and a cover portion which extends beyond the respective edge of each of the other sections.

* * * * *

UNITED STATES PATENT AND TRADEMARK OFFICE
CERTIFICATE OF CORRECTION

PATENT NO. : 4,385,850
DATED : May 31, 1983
INVENTOR(S) : Peter Lutz Bobath

It is certified that error appears in the above-identified patent and that said Letters Patent is hereby corrected as shown below:

Column 1, line 39, delete "and" and insert ----- are -----.

Column 2, line 51, delete "were" and insert ----- are -----.

Column 2, line 65, after "each" insert ----- inner -----.

Column 3, line 27, delete "outer", second occurrence, and insert ----- inner -----.

IN THE CLAIMS

Claim 1, column 4, line 46, delete "section" and insert ----- second -----.

Signed and Sealed this

Fourth Day of September 1984

[SEAL]

Attest:

GERALD J. MOSSINGHOFF

Attesting Officer

Commissioner of Patents and Trademarks